(12) United States Patent
Zheng et al.

(10) Patent No.: US 10,689,469 B2
(45) Date of Patent: Jun. 23, 2020

(54) METHOD OF REACTIVE EXTRUSION COPOLYMERIZATION OF VINYL MONOMERS

(71) Applicants: EAST CHINA UNIVERSITY OF SCIENCE AND TECHNOLOGY, Shanghai (CN); SHANGHAI FUYUAN RUBBER AND PLASTIC TECHNOLOGY LTD., Shanghai (CN)

(72) Inventors: Anna Zheng, Shanghai (CN); Yong Guan, Shanghai (CN); Dafu Wei, Shanghai (CN); Xiang Xu, Shanghai (CN); Pengfei Zhan, Shanghai (CN); Weixing Liu, Shanghai (CN); Han Shi, Shanghai (CN)

(73) Assignees: EAST CHINA UNIVERSITY OF SCIENCE AND TECHNOLOGY, Shanghai (CN); SHANGHAI FUYUAN RUBBER AND PLASTIC TECHNOLOGY LTD., Shanghai (CN)

( * ) Notice: Subject to any disclaimer, the term of this patent is extended or adjusted under 35 U.S.C. 154(b) by 14 days.

(21) Appl. No.: 16/157,974

(22) Filed: Oct. 11, 2018

(65) Prior Publication Data
US 2019/0040174 A1    Feb. 7, 2019

Related U.S. Application Data

(63) Continuation of application No. PCT/CN2017/078308, filed on Mar. 27, 2017.

(30) Foreign Application Priority Data

Apr. 11, 2016    (CN) .......................... 2016 1 0220576

(51) Int. Cl.
*C08F 220/14*    (2006.01)
*C08F 2/10*    (2006.01)
(Continued)

(52) U.S. Cl.
CPC .............. *C08F 220/14* (2013.01); *C08F 2/01* (2013.01); *C08F 2/44* (2013.01); *C08F 212/08* (2013.01);
(Continued)

(58) Field of Classification Search
CPC ........ C08F 220/14; C08F 2/10; C08F 212/08; C08F 265/06; C08F 287/00; C08K 5/005; C08L 25/14; C08L 35/06; C08L 35/7706
(Continued)

(56) References Cited

U.S. PATENT DOCUMENTS 2,530,409 A    11/1950    Stober et al.
3,536,680 A    10/1970    Illing
(Continued)

FOREIGN PATENT DOCUMENTS

CN    1587288 A    3/2005
CN    1644597 A    7/2005
(Continued)

OTHER PUBLICATIONS

Chen et al.; "Research on PMMA production process and equipment", Science & Technology in Chemical Industry, 2012, 20(2), p. 81-84; 4 pages provided; with English Abstract; cited in Specification.

*Primary Examiner* — Kelechi C Egwim
(74) *Attorney, Agent, or Firm* — Hamre, Schumann, Mueller & Larson, P.C.

(57) ABSTRACT

A method of reactive extrusion copolymerization of vinyl monomer consisting of (1) feeding vinyl monomer or at least one vinyl monomer together with an initiator into the first screw of twin-screw extruder, and modified resin into the subsequent screw section; (2) feeding the above monomer into the screw segment after auto-acceleration zone and feeding the initiator corresponding to the temperature of barrel and micro/nano inorganic modified fillers after the
(Continued)

half-life period of the initiator; (3) feeding the antioxidant and anti-UV agent at the end of the polymerization, and then removing unpolymerized monomer and by-products by devolatilization of screw segment; (4) obtaining vinyl copolymer resin with a anticipated molecular weight of $5 \times 10^2$ to $6 \times 10^5$ from the reactive extrusion polymerization by controlling the temperature of different screw segments. The invention which overcomes the existing defects of the free radical polymerization by reactive extrusion technology, can not only meet the requirement of short stay time of reactive extrusion polymerization, combine the functionalization and high performance, but also make it possible to obtain high molecular weight polymers.

13 Claims, 3 Drawing Sheets

(51) Int. Cl.
| | | |
|---|---|---|
| *C08F 212/08* | (2006.01) | |
| *C08F 265/06* | (2006.01) | |
| *C08F 287/00* | (2006.01) | |
| *C08L 25/14* | (2006.01) | |
| *C08L 35/06* | (2006.01) | |
| *C08L 77/06* | (2006.01) | |
| *C08F 2/01* | (2006.01) | |
| *C08F 2/44* | (2006.01) | |
| *C08F 212/10* | (2006.01) | |
| *C08K 5/00* | (2006.01) | |

(52) U.S. Cl.
CPC .......... *C08F 212/10* (2013.01); *C08F 265/06* (2013.01); *C08F 287/00* (2013.01); *C08K 5/005* (2013.01); *C08L 25/14* (2013.01); *C08L 35/06* (2013.01); *C08L 77/06* (2013.01); *C08F 2800/20* (2013.01); *C08K 2201/011* (2013.01); *C08L 2201/08* (2013.01); *C08L 2205/03* (2013.01)

(58) Field of Classification Search
USPC ........................................................ 524/710
See application file for complete search history.

(56) References Cited

U.S. PATENT DOCUMENTS

| | | | |
|---|---|---|---|
| 4,410,659 A | 10/1983 | Lee et al. | |
| 4,542,189 A | 9/1985 | Bodolus et al. | |
| 5,196,489 A * | 3/1993 | Ballard | C08F 4/42 |
| | | | 526/64 |

FOREIGN PATENT DOCUMENTS

| | | |
|---|---|---|
| CN | 1587292 B | 5/2010 |
| CN | 101824151 B | 5/2012 |
| CN | 103146105 A | 6/2013 |
| CN | 105693915 A | 6/2016 |
| JP | H05117305 A | 5/1993 |

* cited by examiner

METHOD OF REACTIVE EXTRUSION COPOLYMERIZATION OF VINYL MONOMERS

TECHNICAL FIELD

The invention relates to a polymerization method of the copolymer, especially to the method with reactive extrusion copolymerization of the vinyl monomer.

BACKGROUND TECHNIQUE

Polymers of vinyl monomers usually referred to as vinyl polymers and the polymeric reaction of these monomers has become an extremely important part in the syntheses of polymers. Such as polystyrene, polyvinyl chloride, poly (meth) acrylates, polyvinyl acetate, ABS resins and all kinds being widely used plastics, rubber, thermoplastic elastomers, coatings, etc. are related with such monomers. The most of them are obtained by free radical polymerization and almost occupy more than half in the polymers. However, due to the fast polymerization speed and large heat release of these polymers and therefore, rapid increases of the melt viscosity, the withdrawal of reaction heat and the diffusion and uniform distribution of the monomer become very difficult to synthesize by the bulk polymerization. Therefore, the solution, suspension, emulsion and other polymerization methods used to carry out instead of bulk polymerization.

Although the solution polymerization method can avoid the difficulties of the bulk polymerization, this polymerization method is exclusively used for theoretical studies because of the slow polymerization rate and the high energy consumption and environmental pollution caused by removing the solvent during the post-treatment process. Therefore, this polymerization method has never been industrialized, exclusive the anionic polymerization, which has to polymerize by this method. Suspension polymerization also avoids the difficulties of heat dissipation and high viscosity. Furthermore, it can easily separate the polymer from water and need not remove the solvent as usually in the solution polymerization process, therefore, it avoids unnecessary energy consumption. For these reasons, it is a successful industrial polymerization method. However, during the process of separation and purification of the polymerized crude product, serious environmental pollution may be caused by having to wash off the large amount of suspending agent and surfactant existing on the surface of the bead polymer. Furthermore, drying the crude product also consumes considerable energy. Besides, due to the residual surfactant and suspending agent, the purity and mechanical properties of the product will be lost for a certain extent. Therefore, this method of polymerization is only used in expandable polystyrene (EPS) processes where polymer properties do not be required very high and the crude polymer beads can be used directly, so that it is very economic. Emulsion polymerization is similar to suspension polymerization. However, because the molecular weight by it can be quite high at higher polymerization rates, which is more favorable for improving the product performance. On the other hand, the problem of environmental pollution is even worse because of the smaller polymer beads that make their surface emulsifiers and surfactants more difficult to remove. Fortunately, the polymers obtained by emulsion polymerization can be directly used as coating, with the result to reduce the energy consumption. However, the process to prepare plastics has brought great pollution, such as emulsion polymerization for ABS production.

The most currently popular polymerization method is the continuous bulk thermal polymerization. This polymerization method has no other impurities entering the system, and polymer is obtained only directly from the monomer, so the product can be of high transparency and environmental pollution also be dropped to a low level. Therefore, the method is very popular in the international. However, this polymerization method has a palpable defect that it is difficult to obtain high the molecular weight at the higher polymerization rate, therefore, the production efficiency drops substantially with increasing molecular weight. For example, if the weight average molecular weight of polystyrene is increased from 270000~280000 to 400000, production efficiency will drop to 40% of normal conditions. Furthermore, in the latter part of the reaction, because of too large a viscosity, the system lacks mass transfer, insulting a very wide molecular weight distribution. Obviously, there always have been some defects in polymerization technique how to carry out the free radical polymerization. Precisely because of this, the research on the polymerization of vinyl monomers by reactive extrusion has emerged one after another.

Stuber et al. used a φ34 mm reverse self-cleaning tight-intermeshing twin-screw extruder to study the bulk polymerization of methyl methacrylate and determined the residence time and distribution of the material by injecting a solid dye into the first barrel. (Stuber N P, Tirrell M. Polym Process Eng, 1985, 3:71).

Lee (Lee R W, Miloscia W J. Standard Oil, U.S. Pat. No. 4,410,659, 1983) and Bodolus et al. (Bodolus C L, Woodhead D A, Standard Oil, U.S. Pat. No. 4,542,189, 1985) used a co-rotating twin screw extruder to research the bulk polymerization of methyl methacrylate with acrylonitrile and nitrile rubber dissolved in monomer. Polymerization conditions: input liquid monomer per minute 27 g (75 parts of acrylonitrile in it), 2.45 g of nitrile rubber, barrel temperature of 110~177° C., screw speed of 75 rpm, 4 minutes of the residence time of material in the extruder, unreacted monomer was withdrawn from the devolatilizer on the extruder. The product had a 77% yield and the impact resistance of it was more than 10 times higher than that without the nitrile rubber.

With regard to the copolymerization of styrene with its corresponding monomer, Stober and Amos (U.S. Pat. No. 2,530,409, 1950) reported their research early in 1950, in which the styrene prepolymer was fed into a single screw extruder with an average residence time of 18 h, a temperature gradient along the screw of 120-200° C. and a screw speed of 1 rpm.

Illing (U.S. Pat. No. 3,536,680, 1970) investigated the bulk copolymerization of styrene with acrylonitrile, methyl methacrylate or acrylamide. In order to provide longer residence time, a 3-order tandem tightly intermeshing twin-screw extrusion reactor was designed. A 5° C. mixture of initiator-containing styrene and acrylonitrile monomer was fed from the feed inlet on the first twin-screw extruder, the material was heated in the extruder to 130-180° C. for 20-40 seconds then fed to second twin screw extruder of a about 60-200 mm in diameter. The monomers are mainly polymerized in the second screw extruder and the reactants flow in a thin layer in order to obtain sufficient and effective kneading. $1.52 \times 10^5$ Pa pressure was kept in the barrel, and the reaction residence time controlled in the range of 1.5 to 18 minutes. The reactant was then fed to third twin-screw extruder where the material was devolatilized and the unreacted monomer was removed from two evacuating ports.

However, as indicated in the above continuous bulk thermal polymerization method, in the polymerization of the vinyl monomer initiated by free radical, there is always a contradiction between the rate of polymerization and the molecular weight of the polymer. In order to achieve a sufficiently high molecular weight, the polymerization time must be very long, however, this is unacceptable for the reactive extrusion process based on continuously rapid production. Conversely, if the polymerization rate needs to be increased, the molecular weight and the conversion rate will be very low. Thus, radical-initiating reactive extrusion polymerization has so far been seldom truly commercialized.

CN 1587292B, CN 1587288A, CN1644597 have published a technique using the anionic polymerization to synthesize some plastics, rubbers and thermoplastic elastomers through the reactive extrusion bulk-polymerization in order to make the bulk reactive extrusion polymerization of the vinyl monomers into industrialization. CN101824151B has published a synthesis technology of fluorosilicone through the reactive extrusion of anionic ring-opening polymerization. However, due to the type of vinyl monomer being suitable for the anionic polymerization is too less, furthermore, the monomers and all the raw materials need to be refined extremely. Although anionic ring-opening polymerization can expand some application area of reactive extrusive polymerization, the channels of reactive extrusion polymerization initiated by the radical must be opened up, since the radical polymerization has the terrifically broad application.

As mentioned above, the early radical-initiated reactive extrusion polymerization is difficult to be practiced due to the larger technical defects. Thus, Chen Jixin et al. (Chemical Science and Technology, 2012, 20(2): 80-84) published a technique, in which MMA monomer pre-polymerizes at first in a polymerization kettle, then enters the screw extruder for the final polymerization with high viscosity. This proposal seems reasonable, but it is virtually impossible to implement. Since there exists a very high risk of burst polymerization while MMA monomer pre-polymerize in the kettle, in which a higher viscosity polymerization system cannot be rapidly cooled and terminated. Even if fortunately the burst polymerization did not happen, it is impossible to obtain the stable products in industrialization.

Visibly, the key obstacle in the free radical-induced polymerization is that there exists always a contradiction between the polymerization rate and the polymerization molecular weight. That is, if to achieve a sufficiently high molecular weight, the polymerization time must extend for too long time, which is unacceptable for the reactive extrusion process in continuous and rapid production. Conversely, the molecular weight will decrease down if the rate of polymerization is to be enhanced. In order to breakthrough this bottleneck, CN103146105B published a technique of reactive extrusion polymerization of (meth)acrylic monomers. Its superior rests with making fully use of auto-acceleration effect in the free radical polymerization process, because only during the auto-acceleration effect interval in the free radical polymerization process, it becomes possible to rapidly enhance both molecular weight and polymerization rate. However, the auto-accelerating effect is a fatal disaster in the usual polymerization kettle and must be avoided as far as possible. Otherwise, the reaction system will immediately generate the burst polymerization, even explosion. However, the twin-screw reactive extrusion is expert in the field of mixing the melt with high viscosity. Because the twin-screw extruder is designed aiming at high-viscosity melt, the extruder can make the melt to be mixed fully, therefore, the heat can be good transfer and the temperature controlled accurately and conveniently. Dispersion and distribution of the mixture are good provided, a small quantity of catalyst and reactants can be mixed equably. Furthermore, because the polymer melt in the screw extruder can get very good surface renewal, which is beneficial to making the small molecule byproducts to be removed out. Visibly, it is the key of the realization of the reactive extrusion polymerization initiated by free radical to fully make use of the autoacceleration effect during the reactive extrusion polymerization. CN103146105B proposed a technique, in which the monomer of acrylic resin, the initiator and the modified resin were fed into the extruder from the first barrel on the first-stage extruder of the double-stage screw extruder. In order to make the polymerization system early enter the aotoacceleration area, the viscosity of the system was changed by regulating the modified resin, thereout, the reactive extrusion polymerization could carry out fleetly. However, there exist still some shortcomings in this technology, such as the ratio of acrylic resin monomer to modified resin is restricted by the viscosity. Second, although the rate of the polymerization may become very high after into the autoaccelerate area, the total quantity of the monomer fed into the extruders limited to the initial added that, more monomers does not be fed into the late barrel of the extruder, therefore, the autoacceleration effect cannot be made good use of, and the production efficiency is restricted severely; Third, the initiator does not be supplementarily added in time after its half-life, delaying the conversion of the polymerization, as a result, productivity also is restricted severely.

Invention Content

The purpose of the present invention is to overcome the above shortcomings of current technique and to provide a technique of the copolymerization, in which both the polymerization rate can fully meet the residence time being very short of the reactive extrusion polymerization, and also meet the request of the high molecular weight for application, which combine the functionalization and high performance in one technique.

The object of the present invention can be achieved by the following technical plan:

A method of the copolymerization of vinyl monomers by the reactive extrusion polymerization, in which the vinyl monomers or at least another vinyl monomer for copolymerization and the initiator are fed to the first barrel on a twin screw extruder and the modified resin is subsequently added in late barrel. The correspond monomers will be supplementarily fed into the barrel after entering the autoacceleration effect area of the system, and the initiator into the barrel corresponding to its decomposition temperature after exceeding its Half-life, as well as the inorganic nanomaterials for modification. The antioxidant and antiultraviolet agent will be added at the end of polymerization, then unpolymerized monomers and byproducts be removed at the devolatilization barrel. The vinyl copolymers with scheduled molecular weight, from $5 \times 10^2$ to $6 \times 10^5$, can be obtained through the reactive extrusion polymerization.

A process of vinyl monomers copolymerization via reactive extrusion is described as following. The vinyl monomers or with at least one kind of vinyl co-monomer and initiator are fed into the first helical segment of the first order twin screw extruder and the modified resin is added into the subsequent screw. Then the corresponding monomers and initiator are fed supplement into the screw segment right after the system enters the auto-acceleration zone, followed by adding micro/nano-inorganic particles then the vinyl pre-copolymer could be extruded and transferred into the second-order twin-screw extruder. The vinyl monomers and initiator are continually added and the polymerization antioxidant and anti-UV agent would be added near the end of the extruder, and the unpolymerized monomers and by-products are removed at the devolatilizing section. The molecular weight of the vinyl copolymer resin could be controlled and adjusted from $5\times10^2$ to $6\times10^5$ via controlling the temperature of different screw segments during the reaction extrusion polymerization.

The mentioned twin-screw extruder has a twin-screw power inlet with a pressure resistance of 0.3 MPa or more without leakage or a tight-intermeshing twin-screw extruder with a reverse flow structure, which is provided with an inert gas introduction unit and devolatilization section, the inert gas introducing unit introduces the inert gas into the devolatilizing section.

The mentioned first-order twin-screw extruder has a double-screw power inlet with a pressure-resistant pressure of 0.3 MPa or more without leakage, or is a tightly intermeshing twin-screw extruder with a reverse flow structure, the second-order twin-screw extruder is Co-rotating or non-rotating twin-screw extruder; the second-order twin-screw extruder is provided with an inert gas introduction unit and a devolatilization spiral unit, and the inert gas introduction unit introduces the inert gas into the devolatilizing section.

The total mass ratio of the mentioned modified resin to the vinyl monomers and the vinyl comonomers ranges 0-30: 100-70; the dosage of the initiator is about 0-20 wt % of the total amount of all the vinyl monomers; The dosage of the mentioned micro/nano inorganic modified material is 0-30 wt % of the total mass of the vinyl monomers; the mass ratio of the antioxidant and the UV-resistant agent is 2:1-1:2. The adding amount of the antioxidants and anti-UV agents is 0.1-1 wt % of the total reactants.

The mentioned vinyl monomers or vinyl comonomers are selected from one or several types of α-methylstyrene, divinylbenzene, acrylonitrile, butadiene, isoprene, methacrylic acid, methylmethacrylate, Ethyl methacrylate, butyl methacrylate, pentyl methacrylate, hydroxyethyl methacrylate, β-hydroxypropyl methacrylate, cyclohexyl methacrylate, glycidyl methacrylate, Acrylic acid, ethyl acrylate, butyl acrylate, pentyl acrylate, hydroxyethyl acrylate, β-hydroxypropyl acrylate, cyclohexyl acrylate, glycidyl acrylate, polycyclic norbornene methacrylate, methacrylic acid Dicyclopentenyl methacrylate, phenyl methacrylate, p-chlorophenyl methacrylate, adamantyl methacrylate, isobornyl methacrylate, vinyl pyridine, maleic anhydride, maleic acid, fumaric acid, Maleic acid monoesters, maleic acid diesters, fumaric acid monoesters, fumaric acid diesters, N-methyl maleimide, N-cyclohexyl maleimide, N-phenyl maleimide, N-tolyl maleimide, N-o-chlorobenzene maleimide, N-Itaconic acid, itaconic acid ester, sorbic acid, sorbic acid ester, tetrafluoroethylene, hexafluoroethylene, vinylidene fluoride, vinyl chloride, vinylidene chloride, vinyl isocyanate or acryloyl chloride.

Among these vinyl monomers, N-phenylmaleimide, dicyclopentenyl methacrylate, phenyl methacrylate, p-chlorophenyl methacrylate, adamantyl methacrylate and the like are copolymerized, can significantly improve the polymer's glass transition temperature and modulus, resulting high performance products. Meanwhile, methacrylic acid, acrylic acid, maleic anhydride, maleic acid, fumaric acid, glycidyl methacrylate, etc. involved after the copolymerization, could endow various functions to the copolymers. The content and distribution of these co-monomers in the macromolecular chains are determined by their reactivity ratio r1, r2, r3 If all the reactivity ratios are far less than 1, then their content and distribution could directly controlled via adjusting the monomer addition. However, if the reactivity ratio of a certain monomer is large or even much larger than 1, then the amount of the monomer should be added to the barrel of the back stage instead of the previous stage of the extruder. Thus, uniform distribution of the monomers in the final copolymers could be achieved.

The content and distribution of each component in the vinyl copolymer can be measured by the commonly used infrared spectroscopy and nuclear magnetic resonance spectroscopy according to the structure of each monomer composition.

The initiators are selected one or several from inorganic peroxide, organic peroxide, azo initiators or redox initiators;

The mentioned inorganic peroxides include potassium persulfate, sodium persulfate and ammonium persulfate;

The mentioned organic peroxide has the general formula: R—O—O—R', wherein R and R' are H, alkyl, acyl or carbonate, R and R' can be the same or different;

The mentioned azo initiators include azobisisobutyronitrile and azobisisobutyronitrile;

The mentioned redox initiators include cumene hydroperoxide-ferrous salt and organic peroxide-tertiary tertiary amine system.

Among the above initiators, the preferred are those which can be dissolved in the monomers, or at least to be able to dissolve in some of the solvents, which can facilitate the quantitative addition and form a homogeneous polymerization system in the twin extruder. In addition, with the increase of polymerization conversion, the viscosity of the system is also constantly increasing, it is necessary to accordingly increase the barrel temperature. Therefore, a single initiator cannot address the requirement of constant active species concentration during the polymerization. The initiator added before the extruder requires a lower decomposition temperature, and after the half-life is reached, the decomposition temperature of the later-added initiator should be increased with the increase of the barrel temperature. Therefore, the sequential supplement of the initiators, makes the polymerization under constant concentration of active species. The copolymer obtained is more uniform and stable.

The mentioned modified resins are selected one or several polymers from butadiene styrene rubber, nitrile rubber, natural rubber, styrene-butadiene-styrene triblock copolymer, styrene-isoprene-styrene triblock copolymer, hydrogenated styrene-butadiene-styrene triblock copolymer, hydrogenated styrene-isoprene-styrene triblock copolymer, styrene/butadiene random copolymer-based thermoplastic elastomer, methyl methacrylate-butyl methacrylate micro nanoscale diblock copolymer, methyl acrylate-butyl acrylate micro-nano-level diblock copolymer, methyl methacrylate-butyl acrylate micro-nano-level diblock copolymer, methyl methacrylate/butyl methacrylate random copolymer, methyl methacrylate/butyl acrylate random copolymer, styrene-butadiene-methyl methacrylate micro-nano-level triblock copolymer, styrene-isoprene-methyl methacrylate micro-nano-level triblock copolymer, thermoplastic polyurethane, and homopolymer or copolymer of a vinyl monomer and comonomers. The addition of the modified resin to the reactive extrusion polymerization system can increase the viscosity of the system, accelerate the emergence of auto-acceleration effect and accelerate the polymerization reaction. Moreover, if the modified resins are rubber or thermoplastic elastomer, the impact resistance of the copolymer will be significantly improved. If the block copolymer is added to the polymerization system, the copolymer can also be used as an excellent polymer compatibilizer.

The mentioned nano-micron inorganic particles are selected from one or several kinds of micro-nano silica, micro-nano calcium carbonate, micro-nano aluminum oxide, micro-nano aluminum hydroxide, micro-nano tantalum pentoxide, micro-nano whiskers, micro-nano quartz, micro-nano cerium oxide, micro-nano europium oxide, micro-nano zirconia, micro-nano barium oxide and micro-nano lanthanum oxide. Addition of a very small amount of nano-micron inorganic particles can not only increase the rigidity, but also improve the toughness of the copolymer to a certain extent. Moreover, the addition of micro-nano whiskers or micro-nano zirconia, can improve the scratch resistance of the copolymer surface; the addition of micro-nano cerium oxide, micro-nano europium oxide, micro-nano barium oxide or micro-nano lanthanum oxide can increase the ability of the copolymer to resist thermal oxidative degradation and obtain functions of fluorescence, light scattering, light-emitting, piezoelectric and the like.

The mentioned antioxidants are selected one or several kinds from commercially available antioxidant 168, antioxidant 1076, antioxidant bht, antioxidant B215, antioxidant 245, antioxidant 1010, thiodipropionate dioctadecyl ester, diphenyl isooctyl phosphite, tetrakis[methyl-β-(3,5-di-tert-butyl-4-hydroxyphenyl) propionate] pentaerythritol ester, 1,3-tris(2-methyl-4-hydroxy-5-t-butylphenyl) butane, 1,1,3-tris (2-methyl-4-hydroxy-5-t-butylphenol), 3,5-di-tert-butyl-4-hydroxyphenyl) propionate, 2,2'-methylenebis (4-methyl-6-tert-butyl) phenol, 4'4-thiobis (6-t-butyl o-cresol), 4,4'-thiobis(3-methyl-6-t-butyl)phenol, 4'4-(dihydroxy-3,3',5,5'-tetra-t-butylbiphenyl). The anti-UV agents are selected one or several kinds of UV-531, UV-9, UV-326, UV-327, UV-328 and UV-329, phenyl hydroxybenzoate, o-nitroaniline or p-cresol.

The mentioned twin-screw extruder has an aspect ratio over than 48/1 and a screw speed of 2-300 rpm.

The mentioned inert gas includes carbon dioxide, nitrogen, helium, argon, butanol, alcohol or water vapor. The choice of inert gas is very important, it is based on the principle that the polarity of inert gas should be as close as possible to the polymer, so as to more efficiently remove the unpolymerized monomers and by-products from the products and avoid as far as possible the inertness with phase transition gas. Water is often used as an auxiliary gas for removal byproducts. The boiling point of water is usually 100° C. at the atmospheric pressure, and the temperature of the extruder is about 200° C. Although it is convenient to be realized in the equipment, the vaporization of water will cause the great energy consumption and solidify the polymers, resulting more difficult to remove by-products. Therefore, carbon dioxide should be the most preferred.

The mentioned reactivity ratio between the vinyl monomer and the vinyl comonomer should be less than or equal to 1, otherwise, monomers with lower reactivity must be added into different screw segments according to the content requirement in the copolymer.

The absolute molecular weight of the above vinyl copolymer obtained via reaction extrusion polymerization can be measured by gel permeation chromatography (GPC).

In order to determine the absolute molecular weight and its distribution of the polymer, multiple-detection system with multiple angle laser detection (LS) and refractive index differential scanning (RI) must be employed, i.e. Wyatt Technologies Water 1515 multi-detection gel permeation chromatography (United States). Tetrahydrofuran (THF), dimethylformamide (DMF), dimethylsulfoxide and the like can be used as the mobile phase at a flow rate of 1.0 ml/min and a detection temperature of 25° C. The column was filled with styrene-divinylbenzene copolymer gel. The mass concentration of the sample solution is 0.002~0.004 g/ml.

The mentioned structural principle of the co-rotating tightly-intermeshing twin-screw extruder with the reverse flow structure is shown in FIG. 1. It is actually a twin-screw pull-out machine. Therefore, the thrust bearing in the gearbox has the opposite bearing direction compared to the normal one. The raw materials are added into the extruder through the screw tip, and the output material is close to one end of the gearbox. The aspect ratio is 48/1 or more, preferably 60/1 or more, and the screw speed is 2-300 rpm. The temperature of each screw segment should be successively increased to the last stage of the extruder, the temperature ranges 100-300° C., higher than the flow temperature of the copolymer.

Twin-screw extruders have a strong ability to transfer viscous melts, but poor capacity for transferring water-like monomers. Therefore, in order to ensure long-term stable operation, the extruder pressure at the entrance must be above 0.3 MPa. The using of a pressure metering pump can not only pump the monomers into the screw, but also promote the monomer with the screw rotation forward.

The extruder using the reverse direction structure is completely closed and there is no leakage problem because the monomers are entered into the extruder at the end of the screw. The output port has turned to one end close to the gearbox. There are two screws running, but at that time, the material has become a high viscous melt, and there is almost no leakage problem.

The inert gas introduction unit of the present invention is shown in FIGS. 2 and 3, whereas 1 is a vacuum depot, 2 is an inert gas entry, and 3 is a unidirectional needle valve. By introducing the inert gas to reduce the partial pressure and has the effect of carrying, it can efficiently remove volatilization components.

ILLUSTRATING THE DRAWINGS

Figure 4:
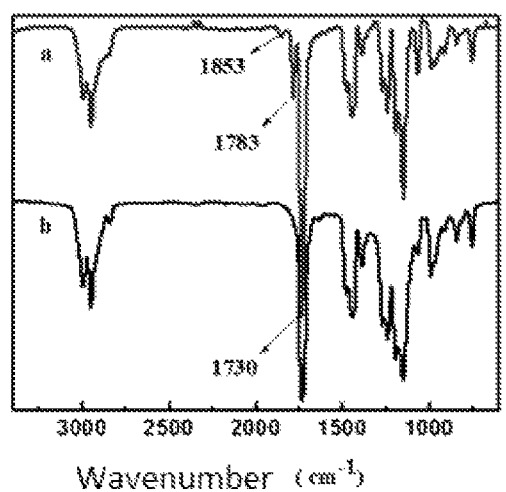
Figure 5:
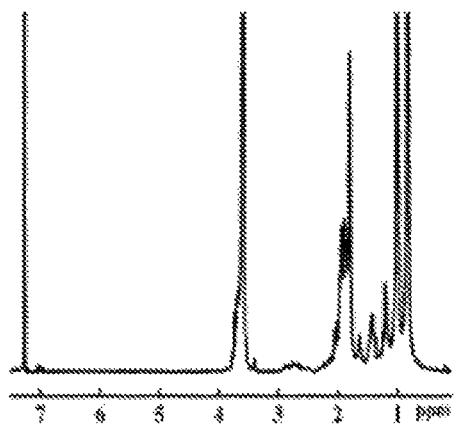
Figure 6:
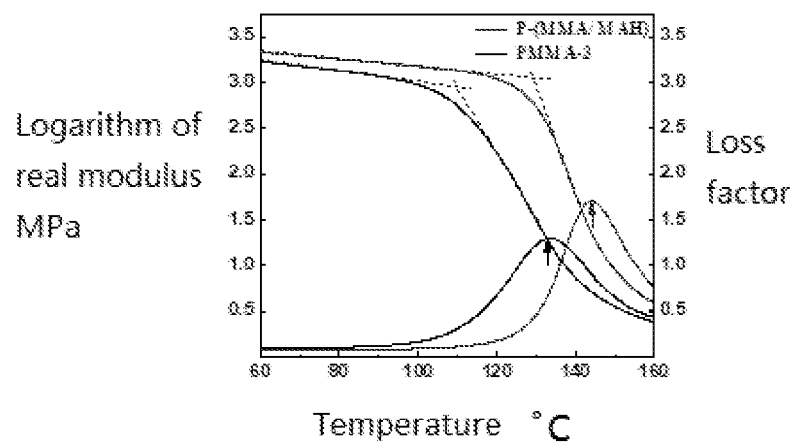
Figure 7:
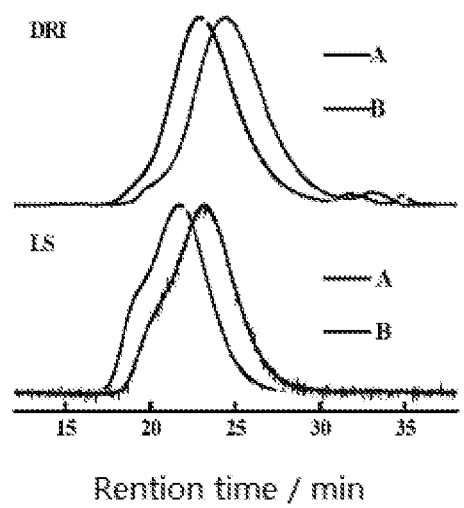
Figure 8:
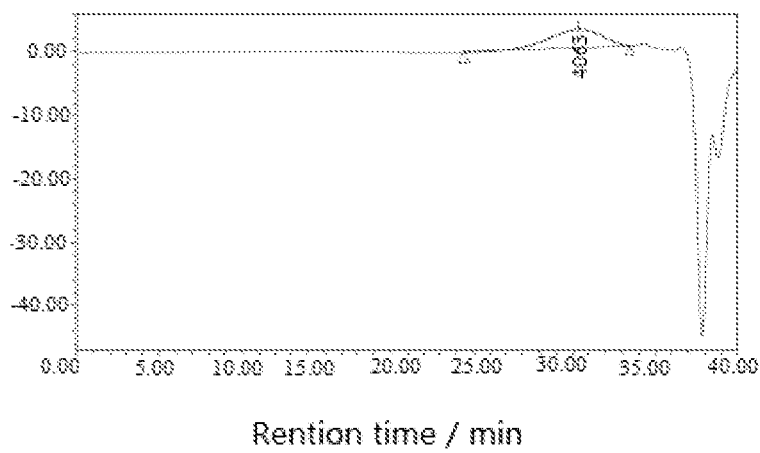

FIG. 4 shows infrared absorption spectrum of MMA/MAH copolymer, a. MMA/MAH copolymer; b. MMA;

FIG. 5 shows 1H-NMR spectrum of the MMA/MAH copolymer;

FIG. 6 shows dynamic mechanical curve of the homopolymer of the MMA/MAH copolymer and the MMA commodity;

FIG. 7 shows GPC map of an example 1 and a comparison case 1, A. comparison case 1; B. embodiment 1;

FIG. 8 shows GPC curve of an example 2 copolymer.

SPECIFIC IMPLEMENTATION METHODS

The present invention is explained in detail with the accompanying drawings and specific examples Example 1

Figure 1:
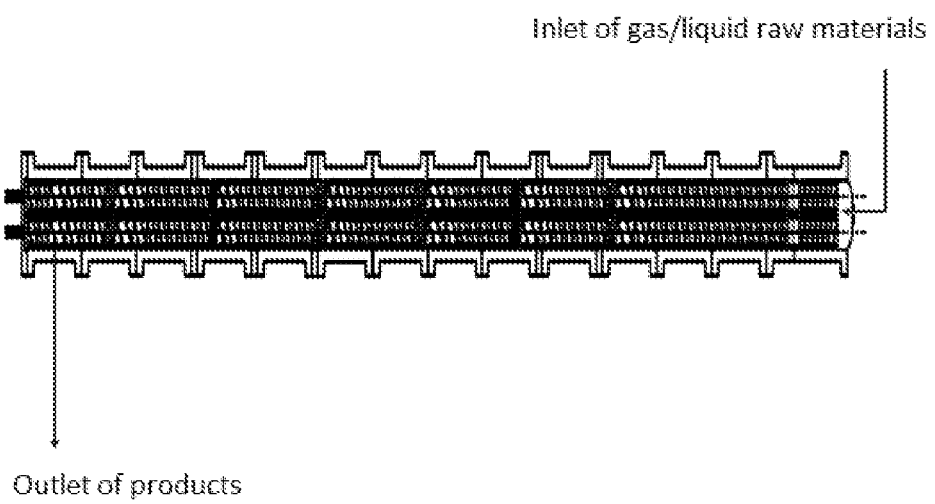
FIG. 1 shows schematic diagram of the structure of a double screw extruder with the same direction rotating tightly meshed in the reverse direction structure.

Methyl methacrylate (MMA) was selected as vinyl monomer, maleic anhydride (MAH) was selected as vinyl co-monomer, and their mass ratio was 95.2:4.8. The competitive rates of rMMA and rMAH were respectively 6.7 and 0.02, indicating that MMA was easier to form homopolymer, and MAH prefer to participate copolymerization. Therefore, it is necessary to increase MAH content in the early stage of polymerization due to its relative lower reactivity. MAH was dissolved in MMA at the mass ratio of 88.9:11.1, along with 0.93% of the total content of the two benzoyl peroxide (BPO). As shown in FIG. 1, the mixture was pumped into the first screw of a co rotating rotary meshing twin extruder of 035 and L/D=60 (ratio of length to diameter), at a rate of 1.54 kg/h, using a diaphragm pump with the limit pressure of 15 MP. The screw cylinder temperature was set form 70~100° C. according to the design of molecular weight of copolymers.

Figure 2:
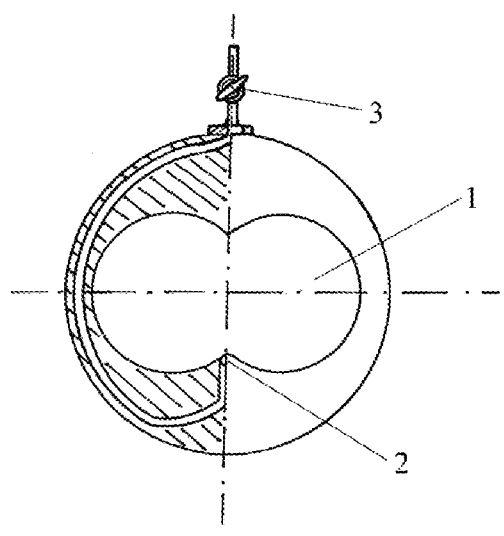
FIG. 2, FIG. 3 show the structural schematic diagram of the inert gas introduction unit in front of the snails.

The vinyl pre-copolymer extruded from first twin-screw could be pumped into the second twin extruder via a melt pump. The second twin extruder is a counter rotating twin screw extruder with a long diameter ratio of L/D=70. As shown in FIG. 2, the inert gas introduction unit, connected with carbon dioxide cylinder, is installed before the fifth section of the reciprocal cartridge of the 18 section. The 5th screw cylinder after the inert gas introduction unit is the dehydrating section, and the pressure reduction system with absolute pressure of 0.0012 MPa is equipped. The mass ratio (99.82:0.18) of MMA to cumene hydroperoxide (IPBP) solution was selected, and the two diaphragm pumps with limiting pressure 15 MPa were used to input the reactants respectively into the second and fifth segments of the second stage extruder at the feeding rate of 1.032 kg/h. Machine barrel temperature was set between 100 and 200° C. The final products were obtained after complete devolatilization, and the conversion of polymerization was 99.999%. The FTIR and NMR spectrum of the refined product were respectively shown in FIGS. 4 and 5. In FIG. 4, a is MMA/MAH copolymer, b is commercial homopolymer of MMA. The GPC results revealed the number average molecular weight and weight average molecular weight were respectively $6.7 \times 10^4$ and $1.0 \times 10^5$. The molecular weight distribution (PDI) was 1.54.

Compared with the pure commercial MMA homopolymer, the absorption bands of 1853 cm-1 and 1783 cm-1 in the FTIR spectrum attribute to the symmetric and asymmetric stretching vibration of carbonyl groups of MAH units, and 1730 cm-1 attributes to the vibration absorption of carbonyl groups of MMA units. The results indicate that MAH successfully participated the copolymerization with MMA. In their NMR spectrum, The molar ratio of MAH:MMA is 0.051 in the copolymer, calculated based on the peak area ratio of methyl hydrogen ($\delta=3.42\sim3.67$) to MAH hydrogen ($\delta=2.6\sim3.1$) according to the NMR spectrum. It is equal with the ratio of added monomers. Therefore, the ideal copolymer can be prepared via reactive extrusion, though the significant difference of reactivity ratio between the two monomers makes them difficulty for their copolymerization.

FIG. 6 is the dynamic mechanical curve of prepared MMA/MAH copolymer and commercial MMA homopolymer. It can be seen that the Glass Transition Temperature of the MMA/MAH copolymer prepared by reactive extrusion is 144° C., 12 degrees higher than the Tg of the homopolymer of MMA. This is due to the introduction of a rigid five membered ring of maleic anhydride in the copolymer. Therefore, Tg and stiffness of the MMA/MAH copolymer are significantly improved. The onset temperature of the decrease of storage modulus is increased by 20° C. than that of PMMA. Therefore, the usage temperature is improved effectively.

Comparative Example 1

Similarly, methyl methacrylate (MMA) was used as the vinyl monomer and maleic anhydride (MAH) as the vinyl comonomer. MAH was dissolved in MMA with the mass ratio of 4.8:95.2. Then 0.4 wt % of BPO and 0.1 wt % of IPBP was dissolved in mixture of monomers. The final solution was pumped into two-order twin-screw extruder at the rate of 3.6 kg/h using the diaphragm pump with the limit pressure of 15 MPa. The temperature settings and devolatilization system are exactly same as those of example 1. The final product via the reactive extrusion polymerization was obtained after sufficient devolatilization, and the polymerization conversion was 85.7%. The number average molecular weight, the weight average molecular weight and the PDI of the product tested by GPC was $6.4 \times 10^4$, $1.3 \times 10^5$ and 2.21, respectively. FIG. 7 shows the GPC spectra of products of example 1 and comparative example 1. The DRI and LS represent the signals of the refractive index and the signals of laser light scattering, respectively.

It can be seen that although the vinyl monomer, the comonomer, the initiator, and their dosages as well as the temperature setting of polymerization in comparative example 1 were identical to those of example 1, still there were two key points different from example. First, since the half-life of initiator is not taken into account in comparative example 1, the initiator is not supplemented in the later stage, resulting in a decrease in the polymerization rate, but an increase of the molecular weight and wider the distribution of molecular weight. In contrast, the entire polymerization process in example 1 was uniform, fast and stable, and the molecular weight distribution was narrow. More importantly, in the comparative example 1 the autoacceleration was not utilized. Therefore, after a large amount of initiator was consumed in the early stage, the initiator was not efficiently used to rapidly increase the conversion rate at the autoacceleration zone. In contrast, a considerable amount of monomer in the example 1 was added to the system after the system entered the autoacceleration zone, thereby taking full advantage of the high polymerization rate and high molecular weight at the autoacceleration zone to rapidly complete the polymerization, and the polymerization conversion rate was almost 100%. However, only 85.7% in the comparative example 1 was obviously not suitable for industrialization.

Example 2

Figure 3:
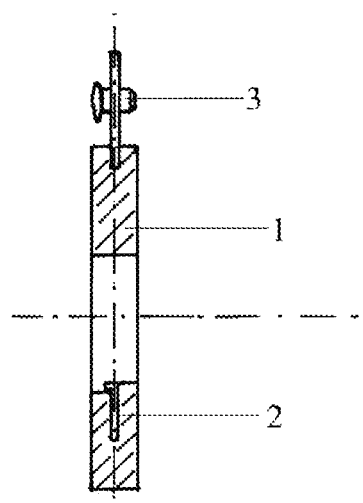

Styrene (St) was selected as vinyl monomer and maleic anhydride (MAH) was selected as vinyl comonomer. The mass ratio of St to MAH was 97.09:2.91. Since the reactivity ratio is consistent with the ideal alternative copolymerization, the composition ratio of the copolymer is the same as that of the raw material. Therefore, there is no need to adjust the raw material to strengthen the some reaction in advance. Then, a styrene-butadiene-styrene triblock thermoplastic elastomer (SBS) with a molecular weight of $1.5 \times 10^5$ was dissolved in the above mixed monomer. The mass ratio of the mixed monomer to the SBS was 7.5:2.5. Azobisisobutyronitrile was used as the initiator, and its dosage was set at 1.2 wt % of mixed monomers. Then the mixed solution was pumped into a co-rotating twin-screw extruder (Φ35, L/D=76, pressure resistance of 1 MPa at the inlet) at a rate of 3.6 kg/h using a diaphragm pump with a limit pressure of 15 MPa. The temperatures of the barrel were set to 70-175° C. according to the requirements of the molecular weight. Because the molecular weight of the polymer is not designed to be very high, and the 25 wt % of SBS thermoplastic elastomer was pre-dissolved in the mixing monomer, the polymerization was directly at the autoacceleration zone. Thus the polymerization rate was very high, only a single extruder was enough to complete the polymerization. Furthermore, the inert gas introduction unit shown in FIG. 2 and FIG. 3 is additionally arranged in the countdown fourth barrel in the overall 19 screw barrels to introduce the inert carbon dioxide. Subsequently, a decompression system with absolute air pressure of 0.0012 MPa is arranged to fully devolatilize. The polymerization conversion rate is 99.999%. The purified product was analyzed by GPC. The number average molecular weight and the molecular weight distribution was 4920 and 1.54, respectively. The GPC curve is shown in FIG. 8.

The nylon 66 was modified by the copolymer prepared using example 2 method, and the results are shown in Table 1.

It can be seen that the copolymer prepared via the example 2 method shows a very significant improvement on the impact resistance of nylon 66 resin, but no significant effect on other mechanical properties. No obvious phase separation was observed. It should be a very good resin to modify nylon.

TABLE 1

Recipes and properties of modified nylon 66 using the copolymers prepared via the method of example 2

| Samples | NYL-0 | NYL-1 | NYL-2 | NYL-3 |
|---|---|---|---|---|
| Copolymer addition (kg) | 0.0 | 13.0 | 26.0 | 39.0 |
| Nylon 66 addition (kg) | 100 | 87.0 | 74.0 | 61.0 |
| Tensile strength (MPa) | 70.3 | 68.0 | 65.7 | 63.5 |
| Bending strength (MPa) | 70.1 | 67.1 | 64.0 | 61.0 |
| Notched impact strength (kJ/m$^2$) | 7.69 | 9.99 | 12.3 | 15.3 |

Example 3

Styrene (St) was selected as vinyl monomer. Acrylonitrile (AN) and epoxy acrylate (GMA) were selected as vinyl comonomers. The mass ratio of St:AN:GMA was 69.9:30:0.1. Since the reactivity ratios of AN and GMA to St are both less than 1, the component ratio of the copolymer can be considered to be the same as the ratio of raw material. Therefore, it is not necessary to consider the pre-reaction to strengthen some raw material.

St, AN and GMA were uniformly mixed. Then 0.80 wt % of benzoyl peroxide (BPO) was added based on the total amount of three monomers. the mixed solution was pumped into a co-rotating tightly meshing twin-screw extruder with a reverse flow structure (Φ40, L/D=65, shown in FIG. 1) at a rate of 1.54 kg/h using a diaphragm pump with an ultimate pressure of 15 MPa. The barrel temperature is set to 70-110° C. according to the requirements of molecular weight of polymers. The vinyl copolymer prepolymer produced in the first-order twin-screw polymerization straightly connected to the second-order counter rotating twin-screw extruder (L/D=75). Furthermore, the inert gas introduction unit shown in FIG. 2 and FIG. 3 is additionally arranged in the countdown sixth barrel in the overall 19 screw barrels to introduce the inert carbon dioxide. At subsequent 6 screw barrels, a decompression system with absolute air pressure of 0.0012 MPa is arranged to fully devolatilize.

The monomers with the same mass ratio (St:AN:GMA=69.9:30:0.1) as the first order extruder were selected to be prepared a solution with isopropyl benzene hydrogen peroxide (IPBP) according to the mass ratio of 99.23:0.77. The solution was pumped into the 2nd and 5th screw barrel of the $2^{nd}$-order extruder at the rate of 1.038 kg/h using two diaphragm pumps with limit pressure of 15 MPa. The screw barrel temperature of the extruder was set at 100~200° C. The final polymer of the reactive extrusion polymerization was fully devolatilized, and the polymerization conversion rate was 99.999%. After GPC analysis, the number average molecular weight, weight average molecular weight and PDI of the sample is $3.2\times10^4$ and $4.6\times10^4$ and 1.44, respectively.

As a compatibilizer for ABS plastics with nylon, polycarbonate (PC), polybutylene terephthalate (PBT), polyethylene terephthalate (PET) and other plastic alloys, the copolymer using example 3 method can obtain very ideal results. The alloy with no macroscopic phase separation can be obtained by adding only a total amount of 5-10%.

Example 4

Styrene is selected as a vinyl monomer, and glycidyl methacrylate (GMA) is selected as a vinyl comonomer, their mass ratio is 99.99:0.01. Because the competitive rate of St to GMA is far less than 1, the copolymer component ratio can be considered as the same as the raw material ratio. Therefore, it is not necessary to consider to pre-action to strengthen some raw material. 0.75 wt % of AIBN was added based on the total amount. Nano-scale silica with a diameter of 80 nm was selected as a functional promoter, and its surface was treated by KH550 silane coupling agent. The mass ratio of the mixed monomers to nano-scale silica is 90.25:9.75, which is fully mixed into suspension. The suspension is pumped into the $1^{st}$ screw barrel of intermeshing co-rotating twin-screw extruder with reverse flow structure (Φ40, L/D=75, FIG. 1) at a rate of 1.82 kg/h using a gear pump with the limit pressure of 16 MPa. According to the requirements for the polymerization of molecular weight, the temperature is 70~100° C. The vinyl copolymer prepolymer in the $1^{st}$-order twin-screw moved to the $2^{nd}$-order counter rotating twin-screw extruder (L/D=75) with 19 screw barrels through a melt pump. The inert gas introduction unit as shown in FIG. 2 and FIG. 3 is additionally arranged in the countdown 5th barrel to introduce the inert carbon dioxide. A decompression system with absolute air pressure of 0.0012 MPa is arranged in the subsequent screw barrels to fully devolatilize. The monomers (St:GMA=99.99:0.01 with the same mass ratio as the $1^{st}$-order extruder) were prepared to be solution with isopropyl benzene hydrogen peroxide (IPBP) according to the mass ratio of 99.23:0.77. The solution was pumped into the 2nd and 5th screw barrel of the $2^{nd}$-order extruder at the rate of 1.038 kg/h using two diaphragm pumps with limit pressure of 15 MPa. The temperature of the extruder is set at 100~200° C. The final polymer of the reactive extrusion polymerization was obtained after full devolatilization, and the sample is completely transparent. The polymerization conversion rate was 99.999%. After GPC analysis, the number average molecular weight, the weight average molecular weight and PDI of the sample are $2.98\times10^5$, $4.68\times10^5$ and 1.57, respectively.

Comparative Example 2

All the operations are the same as those of example 4 except that no nano-silica is added in the mixed monomer. After GPC analysis, the number average molecular weight, the weight average molecular weight and PDI of the sample are 2.92×10⁵, 4.44×10⁵ and 1.52, respectively.

TABLE 2

Comparison of physical properties of polystyrene

| Samples | Tensile strength/ MPa | Bending strength/ MPa | Bending modulus/ GPa | Impact strength/ J/m | Rockwell hardness |
|---|---|---|---|---|---|
| example 4 | 53.6 | 86.7 | 3.5 | 17.0 | 74 |
| comparative 2 | 48.7 | 79.8 | 3.2 | 14.2 | 65 |

The comparison of the properties of polystyrene copolymer in Table 2 shows that the tensile, bending and impact strength of sample from example 4 are all higher than those of sample without nano-silica from example 2 except for complete transparency, particularly, the surface hardness significantly increases, which leads to the better scratch resistance of the material surface.

We claim:
1. A method of reactive extrusion copolymerization of vinyl monomers consisting of:
   (1) feeding a vinyl monomer and/or at least one sort of vinyl comonomer and an initiator into a first screw segment of a twin-screw extruder, and feeding a modified resin into subsequent screw segments;
   (2) feeding the vinyl monomer and/or vinyl comonomer into a screw segment after an auto-acceleration zone, and feeding the initiator corresponding to a temperature of a barrel and micro- or nano-scale inorganic modified fillers after the half-life period of the initiator;
   (3) feeding antioxidants and anti-UV agents at the end of polymerization, and removing unpolymerized monomers and by-products by devolatilization of a screw segment; and
   (4) obtaining a vinyl copolymer resin with an anticipated molecular weight of $5\times10^2$ to $6\times10^5$ from reactive extrusion copolymerization by controlling the temperature of different screw segments.

2. A method of reactive extrusion copolymerization of vinyl monomers consisting of:
   (1) feeding a vinyl monomer or at least one kind of vinyl comonomer and an initiator into a first screw segment of a first twin-screw extruder, and feeding a modified resin into a subsequent screw segment;
   (2) feeding an appropriate monomer into a screw segment behind an auto-acceleration zone, and feeding the initiator corresponding to a temperature of a barrel and micro- or nano-scale inorganic modified fillers after the half-life period of the initiator, and obtaining a prepolymer of vinyl copolymer;
   (3) feeding the prepolymer of vinyl copolymer into a second twin-screw extruder, feeding vinyl monomer and initiator continuously and feeding an antioxidant and anti-UV agents at the end of polymerization, and removing unpolymerized monomers and by-products by devolatilization of a screw segment; and
   (4) obtaining a vinyl copolymer resin with an anticipated molecular weight of $5\times10^2$ to $6\times10^5$ from reactive extrusion copolymerization by controlling the temperature of different screw segments.

3. The method according to claim 1, wherein the twin-screw extruder includes a first twin-screw extruder and a second twin-screw extruder,
   the first twin-screw extruder has a power inlet that can suffer at least 0.3 MPa pressure without leakage, or the first twin-screw extruder is a tight intermeshing twin-screw extruder with a structure of reverse direction flow; and
   the second twin-screw extruder is a co- or counter-rotating twin screw equipped with a devolatilization section and an inert gas introduction unit which introduces an inert gas into the devolatilization section.

4. The method according to claim 2, wherein the first twin-screw extruder has a power inlet that can suffer at least 0.3 MPa pressure; or the first twin-screw extruder is a tight intermeshing twin-screw extruder with a structure of reverse direction flow; and
   the second twin-screw extruder is a co-rotating or counter-rotating twin-screw extruder equipped with a devolatilization section and an inert gas introduction unit which introduces an inert gas into the devolatilization section.

5. The method according to claim 1, wherein the mass ratio of the modified resin to the sum of the vinyl monomer and the vinyl comonomer equals 0-30: 100-70;
   the addition amount of the initiator is 0-20% of the amount of all vinyl monomers;
   the addition amount of the nano- or micron-scale inorganic modified fillers equals 0-30% of the total mass of the vinyl monomer and the vinyl comonomer;
   the mass ratio of the antioxidants to the anti-UV agents is from 2: 1 to 1: 2; and
   the addition amount of the antioxidants and anti-UV agents equals to 0.1-1% of the total mass of reactants.

6. The method according to claim 1, wherein the vinyl monomer or vinyl comonomer is one or several species selected from styrene, acetophenone, divinylbenzene, acrylonitrile, butadiene, isoprene, methacrylic acid, methylmethacrylate esters, ethyl methacrylate, butyl methacrylate, amyl methacrylate, hydroxyethyl methacrylate, β-hydroxypropyl methacrylate, cyclohexyl methacrylate, glycidyl methacrylate , acrylic acid, ethyl acrylate, butyl acrylate, pentyl acrylate, hydroxyethyl acrylate, β-hydroxypropyl acrylate, cyclohexyl acrylate, glycidyl acrylate, polycyclic norbornene methacrylate, dicyclopentenyl acrylate, phenyl methacrylate, p-chlorophenyl methacrylate, adamantyl methacrylate, isobornyl methacrylate, vinyl pyridine, maleic anhydride, maleic acid, maleic acid, maleic acid monoesters, maleic acid diesters, fumaric acid monoesters, fumaric acid diesters, N-methyl maleimide, N-cyclohexyl maleimide, N-phenyl maleimide, N-tolyl maleimide, N-o-chlorobenzene maleimide Itaconic acid, itaconic acid ester, sorbic acid, sorbic acid ester, tetrafluoroethylene, hexafluoroethylene, vinylidene fluoride, vinyl chloride, vinylidene chloride, vinyl isocyanate, and acryloyl chloride.

7. The method according to claim 1, wherein the initiator is one or several species selected from inorganic peroxide, organic peroxide, azo initiator, and redox initiator,
   wherein the inorganic peroxide consists of potassium persulfate, sodium persulfate or ammonium persulfate;
   the general formula of the organic peroxide is R-O-O-R', wherein R and R' are selected from H, alkyl, acyl or carbonate, and R and R' are same or different;
   the azo initiator consists of azobisisobutyronitrile or azobisisobutyronitrile; and
   the redox initiator consists of cumene hydroperoxide-ferrous salt or organic peroxide-aromatic tertiary amine system.

8. The method according to claim 1, wherein the modified resin is one or several species selected from one or more of the group consisting of styrene butadiene rubber, nitrile rubber, natural rubber, styrene-butadiene-styrene triblock copolymer, styrene-isoprene-styrene triblock copolymer, hydrogenated styrene-butadiene-styrene triblock copolymer, hydrogenated styrene-isoprene-styrene triblock copolymer, a styrene/butadiene random copolymer thermoplastic elastomer, a methylmethacrylate-butylmethacrylate microdiblock copolymer material, methyl acrylate-butyl acrylate micron-sized diblock copolymer, methyl methacrylate-butyl acrylate micro/nano diblock copolymer, methyl methacrylate / butyl methacrylate random copolymer, methyl methacrylate/butyl acrylate random copolymer, styrene-butadiene-methyl methacrylate micro-nano triblock copolymer, styrene-isoprene-methyl methacrylate micro-nano triblock copolymer, thermoplastic polyurethane, and a polymer of the vinyl monomer and the vinyl comonomer.

9. The according to claim 1, wherein the micro- or nano-scale inorganic modified fillers are at least one of the group consisting of micro/nano silica, micro/nano calcium carbonate, micro/nano aluminum oxide, micro/nano aluminum hydroxide, micro/nano magnesium hydroxide, micro/nano tantalum oxide, micro/nano whisker, micro/nano quartz, micro/nano oxide tetrahydrate, micro/nano europium oxide, micro/nano zirconia, micro/nano barium oxide, and micro/nano lanthanum oxide.

10. The method according to claim 1, wherein the antioxidants are at least one compound selected from marketselling antioxidant 168, antioxidant 1076, antioxidant bht, antioxidant B215, antioxidant 245 or antioxidant 1010, thiodipropionic acid bis (octadecyl acrylate), Diphenyl isooctyl phosphite, tetrakis [methyl-β-(3,5-di-tert-butyl-4-hydroxyphenyl) propionate] pentaerythritol, 1,3-tris (2-methyl-4-hydroxy-5-tert-butylphenyl) butane, 1,1,3-tris (2-methyl-4- hydroxy-5-tert-butylphenol), 3,5-di-tert-butyl-4-hydroxyphenyl propionate ester, 2,2'-methylenebis (4-methyl-6-tert-butyl) phenol, 4'4- thiobis (6-tert-butyl-o-cresol), 4,4'-thiobis (3-methyl-6-tert-butyl) phenol, 4'4-(di-hydroxy-3,3', 5,5'-tetra-tert-butyl biphenyl); and anti-UV agent is at least one of the compoundings consisting of UV-531, UV-9, UV-326, UV-327, UV-328, UV-329, phenyl o-hydroxybenzoate, o-nitroaniline, and p-cresol.

11. The method according to claim 3, wherein the length-diameter ratio of the twin screw extruder is more than 48/1, and a screw speed is 2-300 rpm.

12. The method according to claim 3, wherein the inert gas is at least one of carbon dioxide, nitrogen, helium, argon, butanol, alcohol, and water vapor.

13. The method according to claim 1, wherein the reactivity ratio of the vinyl monomer to the vinyl comonomer should be less than or equal to 1, otherwise, monomers with a low reactivity must be added to different screw segments according to its content in the vinyl copolymer resin.

* * * * *